United States Patent
Whitehouse et al.

(10) Patent No.: US 8,154,242 B2
(45) Date of Patent: Apr. 10, 2012

(54) METHOD OF FULLY CHARGING AN ELECTRICAL ENERGY STORAGE DEVICE USING A LOWER VOLTAGE FUEL CELL SYSTEM

(75) Inventors: Kristian M. Whitehouse, Rochester, NY (US); David John Keyes, Rochester, NY (US); Joseph J. Ferrero, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 791 days.

(21) Appl. No.: 12/055,604

(22) Filed: Mar. 26, 2008

(65) Prior Publication Data

US 2009/0243536 A1   Oct. 1, 2009

(51) Int. Cl.
*H02J 7/00* (2006.01)
*H02J 7/16* (2006.01)
*H01M 8/04* (2006.01)
*H01M 8/00* (2006.01)

(52) U.S. Cl. ........ 320/101; 320/138; 320/118; 320/116; 320/117; 320/119; 429/432; 429/400; 903/908

(58) Field of Classification Search .................. 320/101, 320/104, 116, 117, 119, 121, 122, 138, 118, 320/150, 155, 135, 136; 429/452, 400; 180/65.31, 180/65.2; 903/908
See application file for complete search history.

(56) References Cited

U.S. PATENT DOCUMENTS

| | | | | |
|---|---|---|---|---|
| 4,670,702 A | * | 6/1987 | Yamada et al. | 320/101 |
| 6,140,799 A | * | 10/2000 | Thomasson | 320/117 |
| 6,541,940 B1 | * | 4/2003 | Jungreis | 320/103 |
| 7,375,985 B2 | * | 5/2008 | Wai et al. | 363/17 |
| 7,427,450 B2 | | 9/2008 | Raiser | |
| 7,632,583 B2 | * | 12/2009 | Pearson | 429/532 |
| 2003/0015992 A1 | * | 1/2003 | Dubac et al. | 320/121 |
| 2003/0106726 A1 | * | 6/2003 | Yoshii | 180/65.1 |
| 2006/0238033 A1 | | 10/2006 | Raiser | |
| 2007/0190369 A1 | * | 8/2007 | Leach et al. | 429/9 |
| 2007/0229022 A1 | * | 10/2007 | Hanafusa et al. | 320/101 |
| 2008/0100258 A1 | * | 5/2008 | Ward | 320/101 |
| 2008/0238355 A1 | * | 10/2008 | Muramatsu | 320/101 |
| 2009/0024267 A1 | * | 1/2009 | Kawai | 701/22 |
| 2011/0006726 A1 | * | 1/2011 | Dittmer et al. | 320/101 |

FOREIGN PATENT DOCUMENTS

CN    2888720 Y    4/2007

\* cited by examiner

*Primary Examiner* — Melissa Koval
*Assistant Examiner* — Alexis Boateng
(74) *Attorney, Agent, or Firm* — John A. Miller; Miller IP Group, PLC

(57) ABSTRACT

A fuel cell system that includes a fuel cell stack and an EESD electrically coupled to a common high voltage bus line. The EESD has a higher voltage output than the fuel cell stack, and thus the stack is unable to fully charge the EESD, for example, at system shut-down. In order to allow the fuel cell stack to fully charge the EESD, the EESD is separated into a plurality of separate electrical storage banks having lower voltage potentials. A series of contactors are provided to electrically couple the storage banks in series during normal system operation, and separately charge the storage banks using the fuel cell stack so that they are fully charged. The series of contactors can also be configured so that the storage banks can be electrically coupled in series during normal operation of the system and be electrically coupled in parallel during charging at system shut-down.

20 Claims, 2 Drawing Sheets

METHOD OF FULLY CHARGING AN ELECTRICAL ENERGY STORAGE DEVICE USING A LOWER VOLTAGE FUEL CELL SYSTEM

BACKGROUND OF THE INVENTION

1. Field of the Invention

This invention relates generally to a fuel cell system including a fuel cell stack and an electrical energy storage device and, more particularly, to a fuel cell system including a fuel cell stack and an electrical energy storage device where the electrical energy storage device is separated into more than one storage bank so that the fuel cell stack has a high enough voltage to charge the electrical energy storage device.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

Most fuel cell vehicles are hybrid vehicles that employ a supplemental power source or electrical energy storage device (EESD) in addition to the fuel cell stack, such as a high voltage DC battery or a super-capacitor. The EESD provides supplemental power for the various vehicle auxiliary loads, for system start-up and during high power demands when the fuel cell stack is unable to provide the desired power. The fuel cell stack provides power to an electric traction motor through a DC high voltage bus line for vehicle operation. The EESD provides supplemental power to the voltage bus line during those times when additional power is needed beyond what the stack can provide, such as during heavy acceleration. For example, the fuel cell stack may provide 70 kW of power. However, vehicle acceleration may require 100 kW of power. The fuel cell stack is used to recharge EESD at those times when the fuel cell stack is able to provide the system power demand. The generator power available from the traction motor during regenerative braking is also used to recharge the EESD.

In the hybrid vehicle discussed above, a bidirectional DC/DC converter is sometimes employed to step down the DC voltage from the EESD to match the EESD voltage to the bus line voltage dictated by the voltage output of the fuel cell stack and step up the stack voltage during EESD recharging. However, DC/DC converters are relatively large, costly, heavy and unreliable, providing obvious disadvantages. It is desirable to eliminate the DC/DC converter from a fuel cell vehicle including a supplemental power source.

There have been various attempts in the industry to eliminate the DC/DC converter in fuel cell powered vehicles by providing a power source that is able to handle the large voltage swing from the fuel cell stack over the operating conditions of the vehicle. Certain types of batteries have also been used to eliminate the DC/DC converter in vehicle fuel cell systems. However, these systems are typically limited by the ability to discharge the battery beyond a certain level. In other words, these types of batteries could be damaged as a result of large voltage swings on the DC bus line during the operation of the system.

In one particular fuel cell system hybrid design, the EESD has a higher voltage potential than the idle voltage of the fuel cell stack, which is the stack maximum, so as to allow the EESD to recapture regenerative braking power from the electric traction motor. It may be desirable to fully charge the EESD at system shut-down so that the EESD can be a capacitor device that would be subject to dissipation over long periods of system shut-down. Thus, the higher the voltage of the EESD at system shut-down the more likely the EESD will have enough charge to operate system loads, such as the cathode air compressor, at the next vehicle start-up. It is possible to use a low voltage battery, such as a 12-volt battery, and a 12 volt to high voltage boost converter to provide energy in addition to the fuel stack power to fully charge the EESD. However, such a recharging scheme offers a number of challenges in design considerations, including the size of the 12 volt battery.

SUMMARY OF THE INVENTION

In accordance with the teachings of the present invention, a fuel cell system is disclosed that includes a fuel cell stack and an EESD electrically coupled to a common high voltage bus line. The EESD has a higher voltage output than the fuel cell stack, and thus the stack is unable to fully charge the EESD, for example, at system shut-down. In order to allow the fuel cell stack to fully charge the EESD, the EESD is separated into a plurality of separate electrical storage banks having lower voltage potentials. A series of contactors are provided to electrically couple the storage banks in series during normal system operation, and separately charge the storage banks using the fuel cell stack so that they are fully charged. The series of contactors can also be configured so that the storage banks can be electrically coupled in series during normal operation of the system and be electrically coupled in parallel during charging at system shut-down.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell system including a fuel cell stack and an EESD separated into a plurality of storage banks is merely exemplarary in nature, and is in no way intended to limit the invention or its applications or uses.

Figure 1:
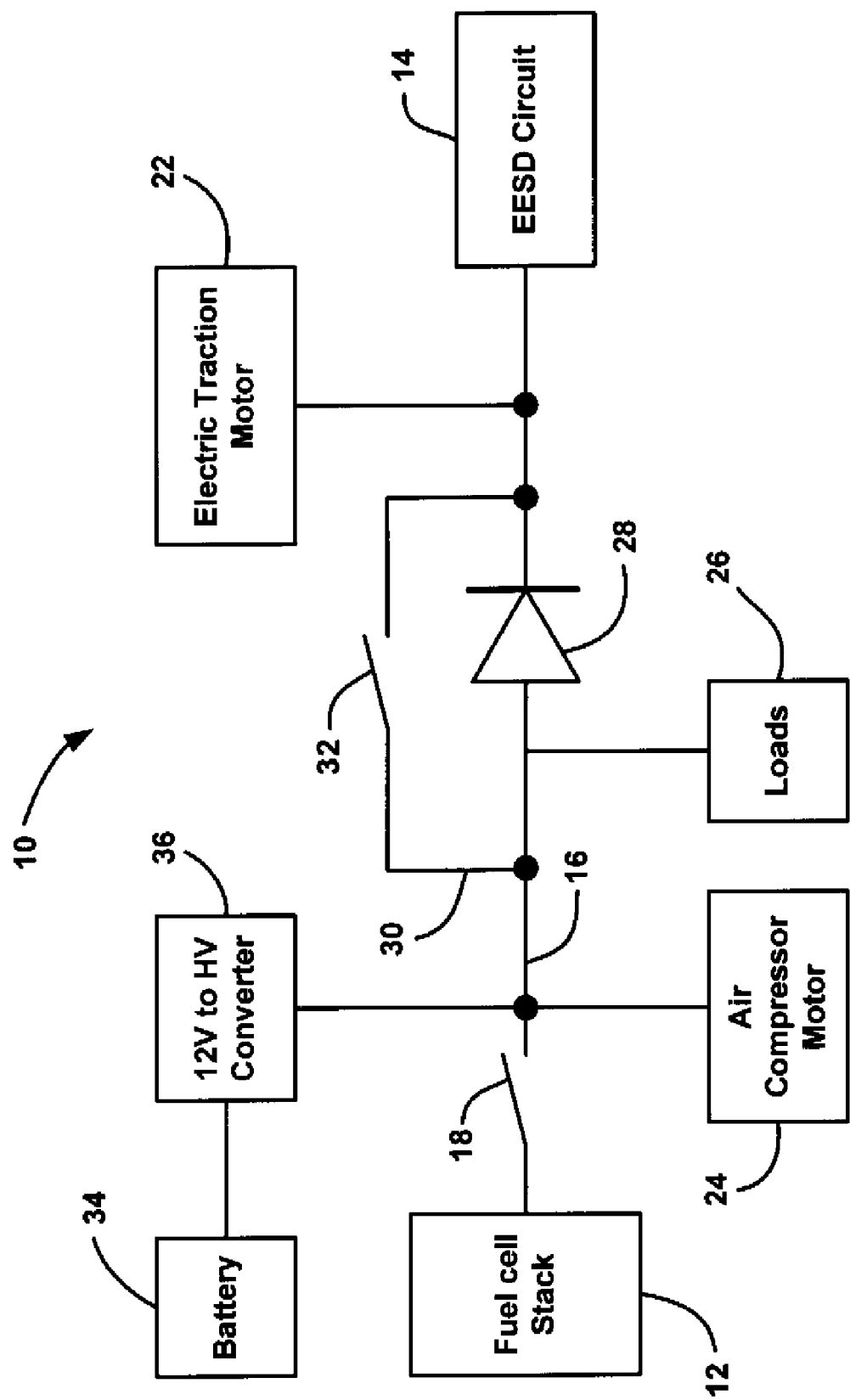
FIG. 1 is a schematic block diagram of a fuel cell system employing a fuel cell stack and an EESD circuit.

FIG. 1 is a schematic block diagram of a fuel cell system 10 including a fuel cell stack 12 and an EESD circuit 14 both electrically coupled to a high voltage bus line 16. As will be discussed in detail below, the EESD circuit 14 includes more than one storage bank. The EESD circuit 14 can employ any suitable DC power source for the purposes described herein, such as a battery, an ultracapacitor, a super-capacitor, etc. A fuel cell stack switch 18 selectively connects and disconnects the fuel cell stack 12 to the high voltage bus line 16. Various electrical components are electrically coupled to the high voltage bus line 16, such as an electric traction motor 22 that propels the vehicle. Additionally, a motor 24 that drives an air compressor for providing air to the cathode side of the fuel cell stack 12 and other system loads 26 are electrically coupled to the bus line 16.

The fuel cell stack 12 and the EESD circuit 14 have different output voltages, where the voltage of the EESD circuit 14 is typically higher, and thus, could damage the fuel cell stack 12. In one non-limiting embodiment, the idle output voltage of the stack 12 is 330V and the full power voltage of the EESD circuit 14 is 400V. As discussed above, DC/DC converters are typically provided in the high voltage bus line 16 to protect the fuel cell stack from the voltage of the high voltage DC power source. In this embodiment, a DC/DC converter is not employed. Therefore, some other technique is needed to protect the fuel cell stack 12. In order to provide this protection, a suitable high voltage diode 28 is provided in the high voltage bus line 16 that prevents the fuel cell stack 12 from seeing the high voltage of the EESD circuit 14. However, at system start-up, when the fuel cell stack 12 is not operating, the energy from the EESD circuit 14 is necessary to operate various system loads, such as the air compressor motor 24.

In order to allow the DC voltage from the EESD circuit 14 to drive the motor 24, it is necessary to by-pass the diode 28. Therefore, a by-pass line 30 is provided around the diode 28, and a by-pass switch 32 is provided in the by-pass line 30 so as to selectively allow the diode 28 to be by-passed. Therefore, during system start-up, the switch 18 is opened and the switch 32 is closed so that electrical energy from the EESD circuit 14 can go around the diode 28 and drive the air compressor motor 24, and the other system loads 26, without damaging the fuel cell stack 12.

The fuel cell system 10 also includes a low voltage battery 34, such as a 12 volt car battery. The battery 34 can provide power to various system and vehicle components that do not require high voltage. However, during certain times, it is desirable to convert the 12 volt DC potential from the battery 34 to a high voltage low power potential to drive certain system components. To provide this conversion, a 12 volt to high voltage converter 36 is provided. The high voltage low power from the converter 36 can be used to drive the air compressor motor 24 to start the fuel cell stack 12 during those times when the EESD circuit 14 may be dead or not have enough power to do so. Thus, this power source operates as a back-up system to the starting sequence using the EESD circuit 14.

Figure 2:
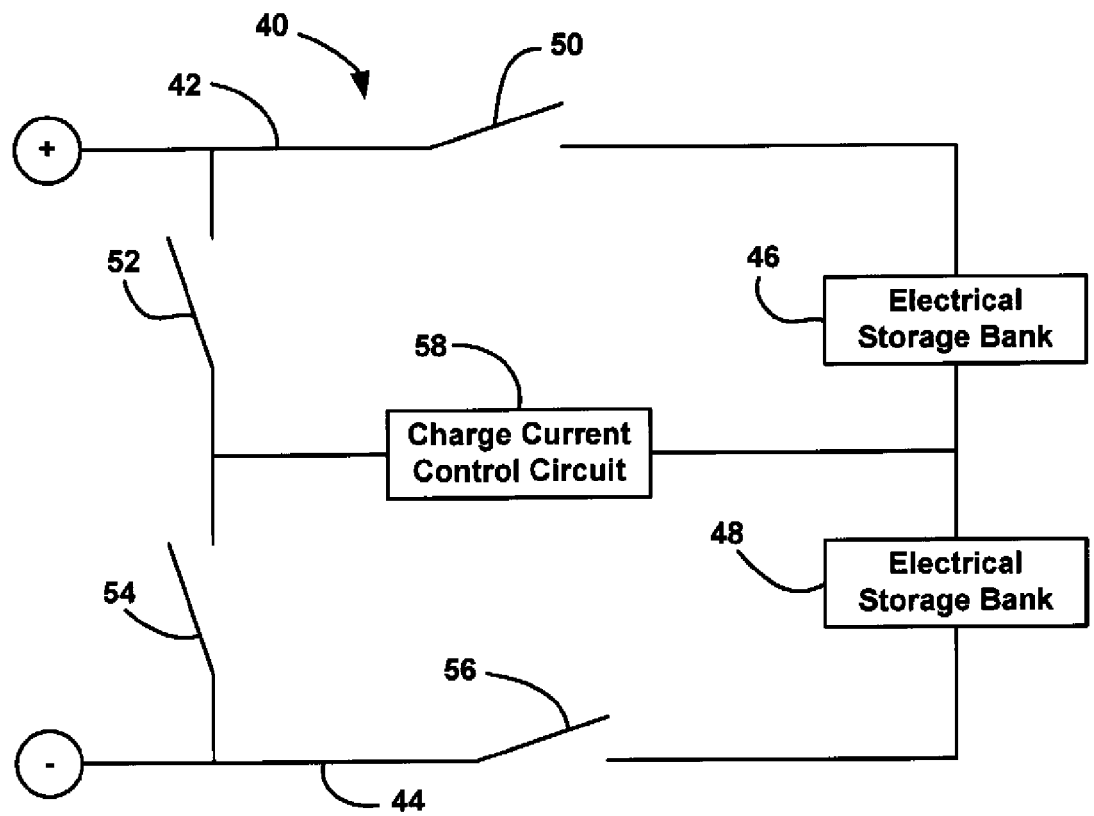
FIG. 2 is a schematic block diagram of an EESD circuit including two storage banks and a series of contactors for electrically coupling the storage banks into and out of a circuit, according to an embodiment of the present invention.

FIG. 2 is a schematic block diagram of an EESD circuit 40 that can be used as the EESD circuit 14, according to an embodiment of the present invention. The EESD circuit 40 includes a positive high voltage bus line 42 and a negative high voltage bus line 44 that combine to represent the voltage bus line 16. In this non-limiting embodiment, the EESD circuit 40 includes two electrical storage banks 46 and 48. The storage banks 46 and 48 can be battery banks, super-capacitor banks, ultracapacitor banks, etc. For the design described above, where the EESD is about 400 volts, the electrical storage banks 46 and 48 would combine to provide the 400 volts where they are electrically coupled in series with the bus lines 42 and 44 during normal operation of the fuel cell system 10 to provide the desired power. The separation of the power outputs of the storage banks 46 and 48 can be any suitable division of power for a particular application. In this embodiment, it is likely that both of the electrical storage banks 46 and 48 would be about 200 volts completely charged. Because each electrical storage bank 46 and 48 has a voltage rating that is less than the idle voltage of the fuel cell stack 12, then the storage banks 46 and 48 can be charged at system shut-down by the fuel cell stack 12. In order to provide the proper electrical connection of the electrical storage banks 46 and 48 to be in series during operation of the system 10 and separated during system shut-down, a series of contactor switches 50, 52, 54 and 56 are provided.

During operation of the fuel cell system 10, at system start-up or at any time when the system 10 is not being shut-down and the electrical storage banks 46 and 48 are being charged by the stack 12, contactor switches 50 and 56 are closed and contactor switches 52 and 54 are opened. In this electrical configuration, the storage banks 46 and 48 are electrically coupled in series with the high voltage bus lines 42 and 44, and will add to provide the full EESD power.

At system shut-down when the fuel cell stack 12 is used to charge the storage banks 46 and 48, the contactor switches 50-56 are configured as follows. In order to charge the storage bank 46, the contactor switches 50 and 54 are closed and the contactor switches 52 and 56 are opened so that the storage bank 46 is electrically coupled to the bus lines 42 and 44 and the storage bank 48 is disconnected from the bus lines 42 and 44. Once the storage bank 46 is charged, the switches 50 and 54 are opened and the switches 52 and 56 are closed to electrically couple the storage bank 48 to the bus lines 42 and 44 to provide charging by the fuel cell stack 12.

A charge current control circuit 58 is provided between the electrical storage banks 46 and 48, as shown. The charge current control circuit 58 is provided to limit the current flow to the stack 12 during charging of the storage banks 46 and 48 to prevent stack damage. In certain situations, the current draw of the storage banks 46 and 48 could be such that they may exceed the current capacity of the stack 12. Thus, the circuit 58 operates as a protection circuit for this purpose. In one embodiment, the charge current control circuit 58 is a suitable resistor that prevents the current flow from exceeding a predetermined value. In alternate embodiments, the charge current control circuit can be a switching network that provides variable current flow for different applications. As is apparent, when the switches 52 and 54 are opened and the switches 50 and 56 are closed during normal system operation, the charge current control circuit 58 is switched out of the system 10, but when the storage banks 46 and 48 are being charged when either the contactor switches 50 and 54 are closed or the contactor switches 52 and 56 are closed, the charge current control circuit 58 is switched into the system 10.

Figure 3:
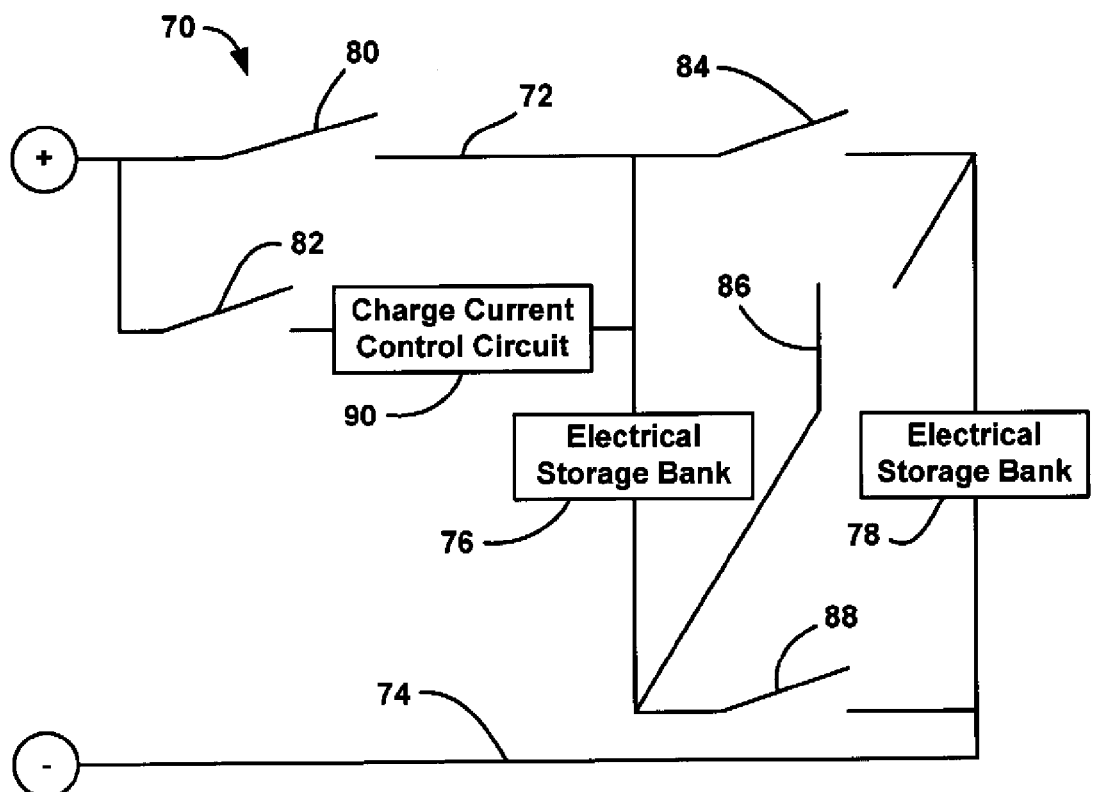
FIG. 3 is a schematic block diagram of an EESD circuit including two storage banks and a series of contactors for electrically coupling the storage banks into and out of the circuit, according to another embodiment of the present invention.

As discussed above, the electrical storage banks 46 and 48 are charged separately at system shut-down. According to another embodiment of the present invention, the electrical storage banks are charged simultaneously at system shut-down. This embodiment is shown in FIG. 3 for an EESD circuit 70 that can replace the EESD circuit 14. The EESD circuit 70 includes a positive high voltage bus line 72 and a negative high voltage bus line 74. The circuit 70 further includes electrical storage banks 76 and 78 similar to the storage banks 46 and 48, and a plurality of contactor switches 80-88. During normal fuel cell system operation when the storage banks 76 and 78 are not being charged and need to be coupled in series to provide full power, the contactors 80 and 86 are closed and the contractors 82, 84 and 88 are opened so that the storage banks 76 and 78 are electrically coupled to the bus lines 72 and 74 in series. When the storage banks 76 and 78 are to be charged at system shut-down, the contactor switches 80 and 86 are opened and the contactor switches 82, 84 and 88 are closed so that the storage banks 76 and 78 are electrically coupled to the bus lines 72 and 74 in parallel with each other. Thus, the storage banks 76 and 78 are charged at the same time and charged evenly in this embodiment. The contactor switch 82 is provided so that a charge current control circuit 90 can be switched into the circuit during charging of the storage banks 76 and 78, and can be switched out of the circuit during normal operation when the switches 80 and 86 are closed.

Although the embodiment discussed above for FIGS. 2 and 3 include two separate storage banks, alternate embodiment may employ three or more storage banks that add up to the desired voltage potential by adding more contactors within the scope of the present invention.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. a positive voltage line;
a negative voltage line;
a fuel cell stack electrically coupled to the positive and negative voltage lines;
a first electrical storage bank selectively electrically coupled to the positive voltage line and the negative voltage line;
a second electrical storage bank selectively electrically coupled to the positive voltage line and the negative voltage line; and
a plurality of contactor switches electrically coupled to the positive voltage line and the negative voltage line, said plurality of contactor switches being selectively opened and closed so that the first and second electrical storage banks are electrically coupled in series to the positive voltage line and the negative voltage line during operation of the fuel cell system and are selectively opened and closed to electrically disconnect the electrical storage banks from being in series at system shut-down when the fuel cell stack is used to charge the first and second electrical storage banks;
wherein the fuel cell system does not require a DC-DC converter.

2. The system according to claim 1 wherein the first and second electrical storage banks combine to have a higher voltage output than the voltage output of the fuel cell stack when they are coupled in series, and wherein each separate electrical storage bank has a voltage output that is less than the voltage output of the fuel cell stack.

3. The system according to claim 1 wherein the first and second electrical storage banks are capacitor banks.

4. The system according to claim 1 wherein the first and second electrical storage banks are battery banks.

5. The system according to claim 1 wherein the plurality of contactor switches are selectively opened and closed to separately charge the first and second electrical storage banks by the fuel cell stack.

6. The system according to claim 5 wherein the plurality of contactor switches is four contactor switches where two of the contactor switches are closed and two of the contactor switches are opened to electrically couple the first and second electrical storage banks in series to the positive and negative voltage lines, a different two of the contactor switches are closed and a different two of the contactor switches are opened to electrically couple only the first electrical storage bank to the positive and negative voltage lines to recharge the first electrical storage bank, and another different two of the contactor switches are closed and another different two of the contactor switches are opened to electrically couple only the second electrical storage bank to the positive and negative voltage lines to charge the second storage bank.

7. The system according to claim 1 wherein the plurality of contactor switches are selectively opened and closed to connect the first and second electrical storage banks in parallel to charge the first and second electrical storage banks at the same time using the fuel cell stack.

8. The system according to claim 7 wherein the plurality of contactor switches is five contactor switches where two of the contactor switches are closed and three of the contactor switches are opened to electrically couple the first and second electrical storage banks to the positive and negative voltage lines in series during operation of the fuel cell system and the two contactor switches are opened and the three contactor switches are closed to electrically couple the first and second storage banks to the positive and negative voltage lines in parallel to simultaneously charge the first and second electrical storage banks using the fuel cell stack.

9. The system according to claim 1 further comprising a charge current control circuit for limiting the current flow to the first and second electrical storage banks during recharging of the first and second storage banks.

10. The system according to claim 9 wherein the charge current control circuit is a resistor.

11. A fuel cell system comprising:
a positive voltage line;
a negative voltage line;
a fuel cell stack electrically coupled to the positive and negative voltage lines;
a first electrical storage bank selectively electrically coupled to the positive voltage line and the negative voltage line;
a second electrical storage bank selectively electrically coupled to the positive voltage line and the negative voltage line; and
a series of four contactor switches electrically coupled to the positive voltage line and the negative voltage line, wherein two of the plurality of contactor switches are closed and two of the contactor switches are opened so that the first and second electrical storage banks are electrically coupled in series to the positive voltage line and the negative voltage line during operation of the fuel cell system, a different two of the contactor switches are opened and a different two of the contactor switches are closed to electrically couple the first electrical storage bank to the positive voltage line and the negative voltage line to recharge the first electrical storage bank and another different two of the contactor switches are opened and another different two of the contactor switches are closed to disconnect the first electrical storage bank from the positive voltage line and the negative voltage line and connect the second electrical storage bank to the positive voltage line and the negative voltage line;
wherein the fuel cell system does not require a DC-DC converter.

12. The system according to claim 11 wherein the first and second electrical storage banks combine to have a higher voltage output than the voltage output of the fuel cell stack when they are coupled in series, and wherein each separate electrical storage bank has a voltage output that is less than the voltage output of the fuel cell stack.

13. The system according to claim 11 wherein the first and second electrical storage banks are capacitor banks.

14. The system according to claim 11 wherein the first and second electrical storage banks are battery banks.

15. The system according to claim 11 further comprising a charge current control circuit for limiting the current flow to the first and second electrical storage banks during recharging of the first and second storage banks.

16. A fuel cell system comprising:
a positive voltage line;
a negative voltage line;
a fuel cell stack electrically coupled to the positive and negative voltage line;
a first electrical storage bank selectively electrically coupled to the positive voltage line and the negative voltage line;
a second electrical storage bank selectively electrically coupled to the positive voltage line and the negative voltage line; and
a series of five contactor switches electrically coupled to the positive voltage line and the negative voltage line, wherein two of the contactor switches are closed and three of the contactor switches are opened to electrically couple the first electrical storage bank and the second electrical storage bank in series to the positive voltage line and the negative voltage Pine and the two contactor switches are opened and the three contactor switches are closed to electrically couple the first and second electrical storage banks in parallel with the positive voltage line and negative voltage to recharge the first and second electrical storage banks using the fuel cell stack.

17. The system according to claim 16 wherein the first and second electrical storage banks combine to have a higher voltage output than the voltage output of the fuel cell stack when they are coupled in series, and wherein each separate electrical storage bank has a voltage output that is less than the voltage output of the fuel cell stack.

18. The system according to claim 16 wherein the first and second electrical storage banks are capacitor banks.

19. The system according to claim 16 wherein the first and second electrical storage banks are battery banks.

20. The system according to claim 16 further comprising a charge current control circuit for limiting the current flow to the first and second electrical storage banks during recharging of the first and second storage banks.

* * * * *